(12) United States Patent
Murray

(10) Patent No.: US 11,004,166 B1
(45) Date of Patent: May 11, 2021

(54) SYSTEMS AND METHODS FOR DATA STORAGE AND ACCESS IN A LEGACY LINK

(71) Applicant: UIPCO, LLC, San Antonio, TX (US)

(72) Inventor: Monica Murray, Helotes, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 316 days.

(21) Appl. No.: 15/290,203

(22) Filed: Oct. 11, 2016

Related U.S. Application Data

(60) Provisional application No. 62/241,924, filed on Oct. 15, 2015, provisional application No. 62/248,106, filed on Oct. 29, 2015.

(51) Int. Cl.
| | | |
|---|---|---|
| *G06Q 50/18* | (2012.01) | |
| *G06Q 50/00* | (2012.01) | |
| *G06F 16/93* | (2019.01) | |
| *G06F 21/62* | (2013.01) | |

(52) U.S. Cl.
CPC .......... *G06Q 50/186* (2013.01); *G06F 16/93* (2019.01); *G06F 21/6218* (2013.01); *G06Q 50/01* (2013.01)

(58) Field of Classification Search
CPC .................................................. G06Q 50/186
USPC ....................................................... 705/312
See application file for complete search history.

(56) References Cited

U.S. PATENT DOCUMENTS

| | | | |
|---|---|---|---|
| 6,340,978 B1* | 1/2002 | Mindrum ............... | G06Q 10/10 715/733 |
| 7,917,415 B1* | 3/2011 | Petruzzi ................. | G06Q 40/00 705/30 |
| 8,255,335 B1* | 8/2012 | Barth .................... | G07F 7/1075 379/91.01 |
| 2002/0077924 A1* | 6/2002 | Spetner .............. | G06Q 30/0267 705/26.43 |
| 2002/0111946 A1* | 8/2002 | Fallon .................... | G06Q 10/10 |
| 2004/0181436 A1* | 9/2004 | Lange .................... | G06Q 40/08 705/4 |
| 2005/0011093 A1* | 1/2005 | Peterson ................... | G09F 3/00 40/27.5 |
| 2005/0086220 A1* | 4/2005 | Coker ................. | H04M 3/5166 |
| 2007/0061424 A1* | 3/2007 | Mattaway ........... | H04L 63/0861 709/219 |

(Continued)

OTHER PUBLICATIONS

Tech.Co, "5 of the Coolest Insurance Apps," http://tech.co/5-coolest-insurance-apps-2013-09, Sep. 16, 2013, 5 pages.

(Continued)

*Primary Examiner* — Maria C Santos-Diaz
(74) *Attorney, Agent, or Firm* — Perkins Coie LLP

(57) ABSTRACT

Methods and systems described in this disclosure create a legacy account for a user and an electronic storage unit or space associated with the legacy account. Documents received into the electronic storage unit or space are tagged with an access designation designating who has access to the documents and when the documents can be accessed. In response to receiving an indication of a passing of the user, the legacy account can be designated as an estate account and the access to the documents can be changed in accordance with the access designation and the designation of the legacy account as the estate account.

16 Claims, 9 Drawing Sheets

(56) References Cited

U.S. PATENT DOCUMENTS

| | | | | |
|---|---|---|---|---|
| 2010/0020718 A1* | 1/2010 | Tabbara | .................. | H04L 47/70 370/254 |
| 2010/0100561 A1* | 4/2010 | Cooper | .............. | G06Q 10/1057 707/769 |
| 2013/0097235 A1* | 4/2013 | Zhou | ....................... | H04W 4/21 709/204 |
| 2013/0311528 A1* | 11/2013 | Liebermann | ............ | G06F 17/30 707/899 |
| 2013/0339064 A1* | 12/2013 | Denning | ................ | G06Q 40/08 705/4 |
| 2014/0279450 A1* | 9/2014 | Gujral | .................... | G06Q 30/04 705/40 |

OTHER PUBLICATIONS

M. Steinhart, "MetLife Achieves Customer Focus With Big-Data," All Analytics, http://www.allanalytics.com/author.asp?section_id=3314&doc_id=268654, Oct. 10, 2013, 3 pages.

MetLife's Infinity App Wins Fifth Industry Award and Ranks as Mast Popular Insurance App in Hong Kong, http://www.businesswire.com/news/home/20150515005185/en/MetLife%E2%80%99s-In, May 15, 2015, 2 pages.

S. Buhr, "Estate Assist Wants to Provide Estate Planning for The Social Media Age," TechCrunch.com, https://techcrunch.com/2014/10/01/estate-assist-wants-to-provide-estate-planning-for-the-, Oct. 1, 2014, 5 pages.

\* cited by examiner

SYSTEMS AND METHODS FOR DATA STORAGE AND ACCESS IN A LEGACY LINK

CROSS-REFERENCE TO RELATED APPLICATIONS

This application is a non-provisional of and claims priority to U.S. Provisional Application No. 62/241,924, filed on Oct. 15, 2015, entitled "SYSTEMS AND METHODS FOR DATA STORAGE AND ACCESS IN A LEGACY LINK," and U.S. Provisional Application No. 62/248,106, filed on Oct. 29, 2015, entitled "SYSTEMS AND METHODS FOR DATA STORAGE AND ACCESS IN A LEGACY LINK," both of which are hereby incorporated by reference in their entireties for all purposes.

TECHNICAL FIELD

Various embodiments of the present disclosure generally relate to data storage and access. More specifically, various embodiments of the present disclosure relate to methods and systems for data storage and access in a legacy link.

BRIEF DESCRIPTION OF THE DRAWINGS

Embodiments of the present disclosure will be described and explained through the use of the accompanying drawings in which:

FIG. 7 depicts a user interface that may be used operations in accordance with various embodiments of the disclosure;

FIG. 8 depicts a user interface that may be used operations in accordance with various embodiments of the disclosure.

DETAILED DESCRIPTION

Figure 1:
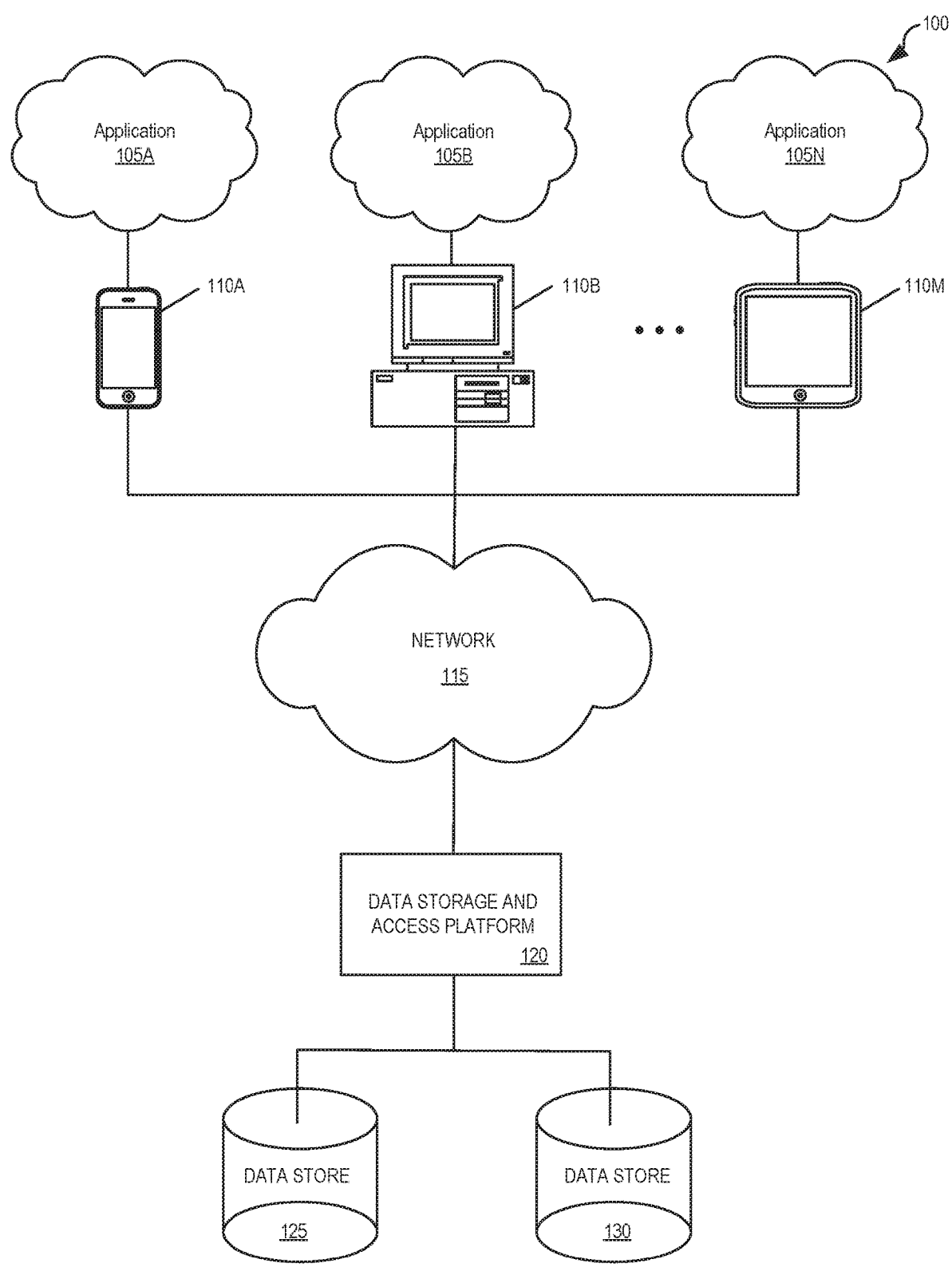
FIG. 1 illustrates an example of a network-based operating environment in accordance with various embodiments of the disclosure.

Various embodiments of the present disclosure generally relate to data storage and access. More specifically, various embodiments of the present disclosure relate to methods and systems for data storage and access in a legacy link.

Today, some insurance companies offer products that focus only on the death event (e.g., life insurance) rather than on the creation of a legacy. When a company focuses only on a death event, the relationship may end when the subscriber passes away. Creating a legacy provides an organization an opportunity to give advice, help with financial planning, take survivors through the survivor benefits process, and ultimately lead to new relationships with beneficiaries.

Users of the system benefit by receiving checklists, advice, guidance, roadmaps for creating a legacy, a seamless experience for survivors to start a survivor benefits process, and an access controlled electronic storage unit/space such as an electronic lockbox. The access controlled electronic storage unit provides a one stop shop for all important documents (e.g., wills, investments, video e-cards, passwords, messages, medical directives).

Embodiments of this disclosure create an access controlled legacy for a user by creating a legacy account for a user and an access controlled electronic storage unit that is associated with the legacy account. Documents that are received can be parsed to determine what type of document (e.g., will, driver's license, love letter) or what category of document it is (e.g., legal, personal) and stored in the access controlled electronic storage unit. Each document may be tagged with an access designation designating who has access, when that person has access (e.g., before the user passes, after the user passes, particular time after the user passes such as an age of the beneficiary), type or document, and/or other information. The user may be provided offers for products based on the contents of their documents (e.g., insurance for valuable property) and may gain reward points for any product purchased. In some embodiments the reward points may be used to purchase storage for the access controlled electronic storage unit.

When the system receives a notification that the user has passed away, the legacy account can be designated as an estate account to start the survivor benefits process. After the designation of the estate account, access to the documents may be changed in accordance with the access designation. After the user passes way, the documents may be locked so that the documents are not editable. A virtual legacy wall posting and/or hologram may be created, commemorating the user. The user's funds may be distributed to the beneficiaries or transferred to a holding account while the beneficiaries determine how to distribute or invest the funds.

This disclosure describes data access and storage systems for legacy accounts designed to increase the security of data and to ease the transition of an estate to the beneficiaries. Various embodiments may provide one or more of the following technological improvements: 1) improved protection of sensitive data, 2) improved processes for providing and preventing access to documents, 3) improved methods for providing rewards for use and/or purchase of a product, 4) improved accuracy and efficiency in targeting potential new members, 5) improved methods of nurturing and directing new members through the eligibility process, and 6) improved communication between the members/survivors and the company.

In the following description, for the purposes of explanation, numerous specific details are set forth in order to provide a thorough understanding of embodiments of the present disclosure. However, it will be apparent on reading the disclosure to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; a wearable device such as a smartwatch; etc.). In some embodiments, applications 105A-105N may be stored on one or more computing devices 110A-110M or may be stored remotely on a server (in the "cloud"). These computing devices can include mechanisms for receiving and sending traffic by connecting through network 115 to data storage and access platform 120, and data stores 125 and 130.

Computing devices 110A-110M may be configured to communicate via the network 115 with data storage and access platform 120. In some embodiments, computing devices 110A-110M can retrieve or submit information to data storage and access platform 120 and run one or more applications with customized content retrieved by data storage and access platform 120 and data stores 125 and 130. For example, computing devices 110A-110M can execute a browser application or a customized client to enable interaction between the computing devices 110A-110M, data storage and access platform 120, and data stores 125 and 130.

Network 115 can be any combination of local area and/or wide area networks, using wired and/or wireless communication systems. Network 115 can be or could use any or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies, languages, and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Data storage and access platform 120 can be running on one or more servers and can be used to generate a legacy account, create an electronic storage unit/space, tag documents in the electronic storage unit/space with access designations and/or document identifiers, receive a notification of death, transition the legacy account to an estate account, assist survivors through claims processes, store profiles and/or policies in data stores 125 and 130, and/or perform other activities. In some embodiments, data storage and access platform 120 includes various data processing and analytic tools that allow for determination of documents and their proper access designations. In some embodiments, data storage and access platform 120 is a server.

Data storage and access platform 120 may be communicably coupled with data stores 125 and 130 and computing devices 110A-110M, and may communicate, access, or receive data (e.g., insurance policies, medical directives, estate planning documents) from computing devices 110A-110M and data stores 125 and 130. Data storage and access platform 120 may be associated with a membership organization, and the users may be members of the membership organization. The organization may be a financial institution and/or an insurance company.

Data storage and access platform 120 may be customized or calibrated by individual companies or service providers based on user needs and/or business objectives. For example, companies may have different business rules and/or different criteria for determining insurance rates for valuable property, who is eligible for membership to the organization, who should be allowed access to documents, and when the access should be granted.

Data stores 125 and 130 can be used to manage storage and access to user data such as family members, beneficiaries, video e-cards, medical directives, accounts, outstanding bills, and other information. Data stores 125 and 130 may be a data repository of a set of integrated objects that are modeled using classes defined in database schemas. Data stores 125 and 130 may further include flat files that can store data. Data storage and access platform 120 and/or other servers may collect and/or access data from the data stores 125 and 130.

Figure 2:
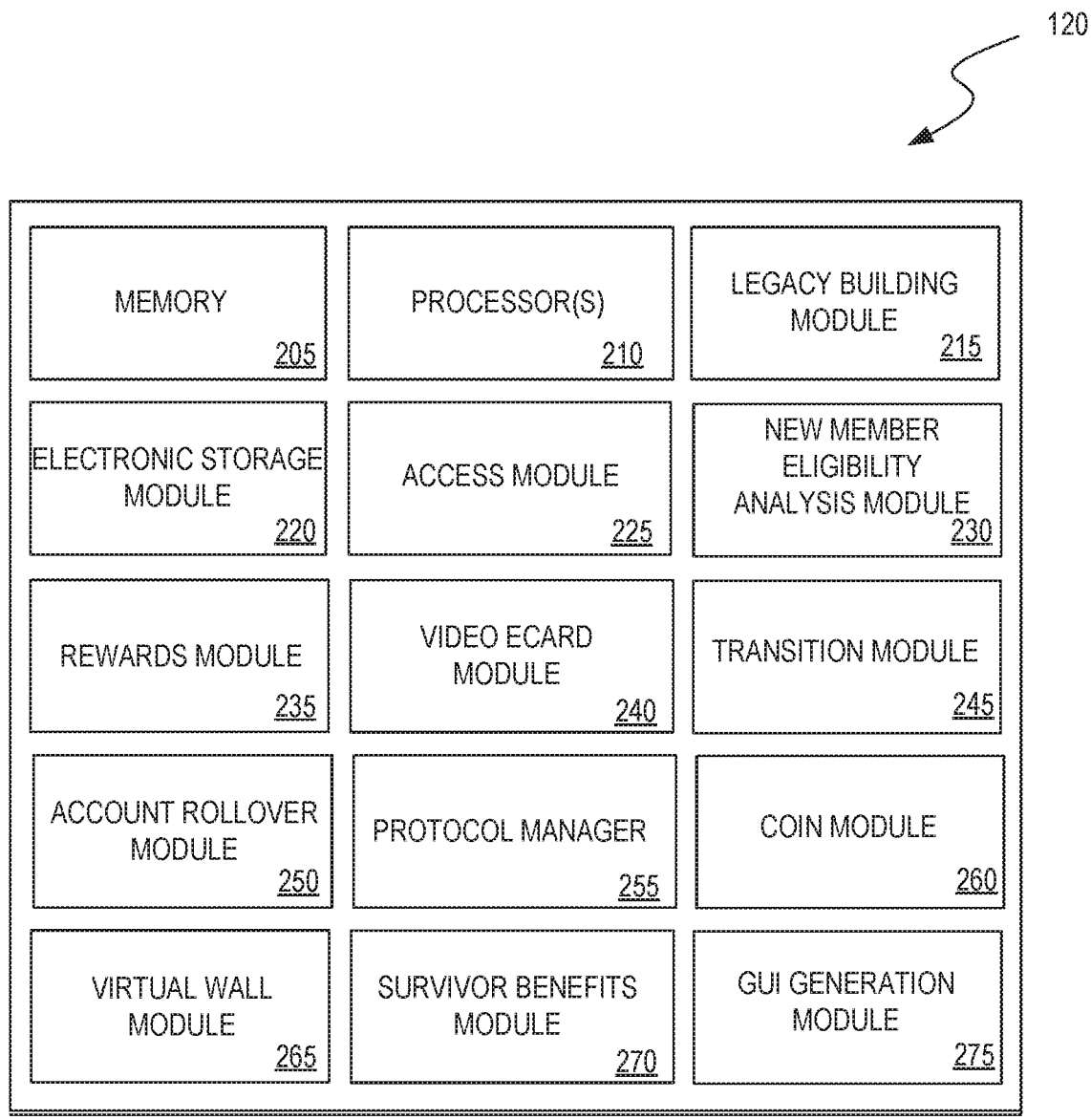
FIG. 2 illustrates various components of a computing device that may be used in accordance with one or more embodiments of the disclosure.

FIG. 2 illustrates a set of components within data storage and access platform 120 according to one or more embodiments of the present disclosure. According to the embodiments shown in FIG. 2, data storage and access platform 120 can include memory 205, one or more processors 210, legacy building module 215, electronic storage module 220, access module 225, new member eligibility analysis module 230, rewards module 235, video e-card module 240, transition module 245, account rollover module 250, protocol manager 255, coin module 260, virtual wall module 265, survivor benefits module 270, and graphical user interface (GUI) generation module 275. Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module.

Memory 205 can be any device, mechanism, or populated data structure used for storing information. In accordance with some embodiments of the present disclosure, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Memory 205 may be used to store instructions for running one or more applications or modules on processor(s) 210.

For example, memory 205 could be used in one or more embodiments to house all or some of the instructions needed to execute the functionality of legacy building module 215, electronic storage module 220, access module 225, new member eligibility analysis module 230, rewards module 235, video e-card module 240, transition module 245, account rollover module 250, protocol manager 255, coin module 260, virtual wall module 265, survivor benefits module 270, and GUI generation module 275.

Legacy building module 215 can receive, collect, and/or gather information to create a legacy account in an interactive process. Instead of simply offering life insurance or other survivor benefit, legacy building module 215 receives documents and/or information, parses the documents and/or information, and determines what products should be offered based on the information. For example, legacy building module 215 may receive a will that gifts certain properties to one or more beneficiaries. Details on an insurance policy to cover some of the properties (where appropriate) may be offered to the user.

Legacy building module 215 can generate a family tree with each leaf as a person in the family. Legacy building module 215 can store documents into an electronic storage via electronic storage module 220. Electronic storage module 220 can store documents (e.g., wills, insurance policies, medical directives, death certificates, videos, cards, video e-cards, notes). In some embodiments, upon receiving a notification that the user has passed away from transition module 245, the legacy account can be transitioned to an estate account, allowing for survivors to begin the estate process.

Access module 225 can provide and govern access to the electronic storage unit/space. Each document can have an access designation indicating who can see the document and when the person can see the document. As documents are received into the electronic storage unit/space from legacy building module 215, access module 225 can determine a type of the document and tag the document with an initial indicator of access. For example, when it is determined that the document is a will, access module 225 may automatically provide access to the executor but withhold from other family members. Documents may be designated with a "share now" (e.g., while the user is alive) or "share later" (e.g., after the user passes away), or another timeframe based on a date, event or otherwise (e.g., share with Peter when he turns 16). The user can change the access designations as appropriate.

In some embodiments, upon receipt of a notification from transition module 245 that the user has passed away, access module 225 can change access to one or more documents. For example, access to documents designated with a "share later" tag may be granted to the appropriate individuals. Additionally, after receiving the notification, access module 225 can lock the documents in the electronic storage unit/space so that they cannot be edited, changed, or deleted unless specific access was granted by the user. Each person with access to any document in the electronic storage unit/space may be required to set up a username and password (or other authentication method) to access documents.

New member eligibility analysis module 230 analyzes family members, executors, lawyers, friends, or others mentioned in the documents to determine if these people are eligible to be members in the organization. For example, some membership organizations requirement members to be members of special groups such as the military. When potential new members are identified, new member eligibility analysis module 230 may determine whether the potential new members are members. If not, the potential new members may be contacted or the user may be reminded that the potential new members qualify for membership. In some embodiments, potential new members may be given access to view documents in the electronic storage unit/space via access module 225. Potential new members may be alerted that they can become members when provided access to the documents.

Rewards module 235 can provide rewards for the purchase of products and/or the recruitment of new members. In some embodiments, the rewards points can be used to purchase additional storage for the electronic storage unit/space. Badges can be earned with the rewards points. The badges may represent the type of product purchased.

Video e-card module 240 can generate a video e-card from the user to survivors. The video e-card can include a video message that is personalized for one or more survivors. The video e-card can be modified any time before death by the user. Video e-card module 240 can be stored in the electronic storage unit/space. Typically, video e-cards are not shared until the user's death.

Transition module 245 receives a notification that the user has passed away. The notification may be received as a death certificate. In some embodiments, a call from a member informing the organization of the user's death must be verified by receiving a death certificate. Various services for beneficiaries and family members may be provided by transition module 245.

In some embodiments, instead of the survivors providing the death certificate to the organization, transition module 245 can retrieve death certificates on behalf of the survivors.

After transition module 245 receives the death certificate, account rollover module 250 rolls assets directly into a particular legacy account and/or one or more accounts associated with beneficiaries. The account designations and amounts may be derived from documents in the electronic storage unit/space. In some embodiments, a debit card can be provided to beneficiaries to provide access to the funds and an opportunity for the beneficiaries to discuss investments after the grieving process.

Protocol manager 255 can alter the interactions with family members who contact the company. The interactions may be altered by offering condolences, providing particular guidance or options with regard to survivor claims, viewing basic information regarding the deceased, among other changes. The representative may be notified by a popup on a screen when a family member calls. The family member may be directed to certain portions of the website or mobile application for particular services related to beneficiaries or the estate when the family member logs on to a website or mobile application of the organization.

Coin module 260 can create or commission the creation of a commemorative coin for the survivors and send the coin to the family of the deceased upon receiving notification from transition module 245 of the death of the user. The coin may include information relating to the member such as a member number and a note about survivor benefits.

Virtual wall module 265 can create and/or add a hologram, posting, or other remembrance of the deceased user to a virtual wall or area for the survivors and other members of the company to see. The hologram, posting or other remembrance may include particular facts or information about the user such as a member number.

Survivor benefits module 270 can provide a beneficiary guide explaining the survivor benefits process. Advice and next steps may be explained by survivor benefits module 270.

GUI generation module 275 is capable of generating one or more GUI screens that allow for interaction with a user. In at least one embodiment, GUI generation module 275 generates a graphical user interface receiving and/or conveying information to the user. For example, GUI generation module 275 may display documents and their access designations in the electronic storage unit/space, products that may benefit the user and/or a family member, and virtual wall postings.

FIGS. 3-6 are flowcharts illustrating sets of operations for storing and analyzing data. In some embodiments, fewer than all of the operations in each set of operations are performed, whereas in other embodiments additional operations are performed. Moreover, in some embodiments, the operations may be performed in different orders or in parallel. The operations can be performed by various components of data storage and access platform 120 illustrated in FIG. 2.

Figure 3:
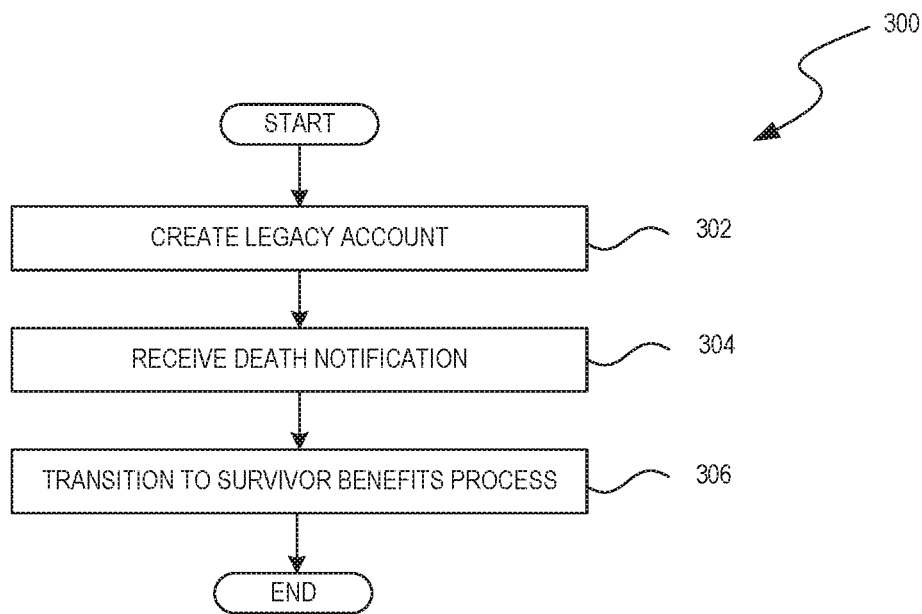
FIG. 3 is a flowchart illustrating a set of operations in accordance with various embodiments of the disclosure.

FIG. 3 is a flowchart illustrating a set of operations 300 for storing and accessing data. Creating operation 302 creates a legacy account by receiving documents and information from a user. Receiving operation 304 receives a notification that the user has passed away. Transitioning operation 306 transitions the legacy account to an estate account and allows the survivor benefits process to begin.

Figure 4:
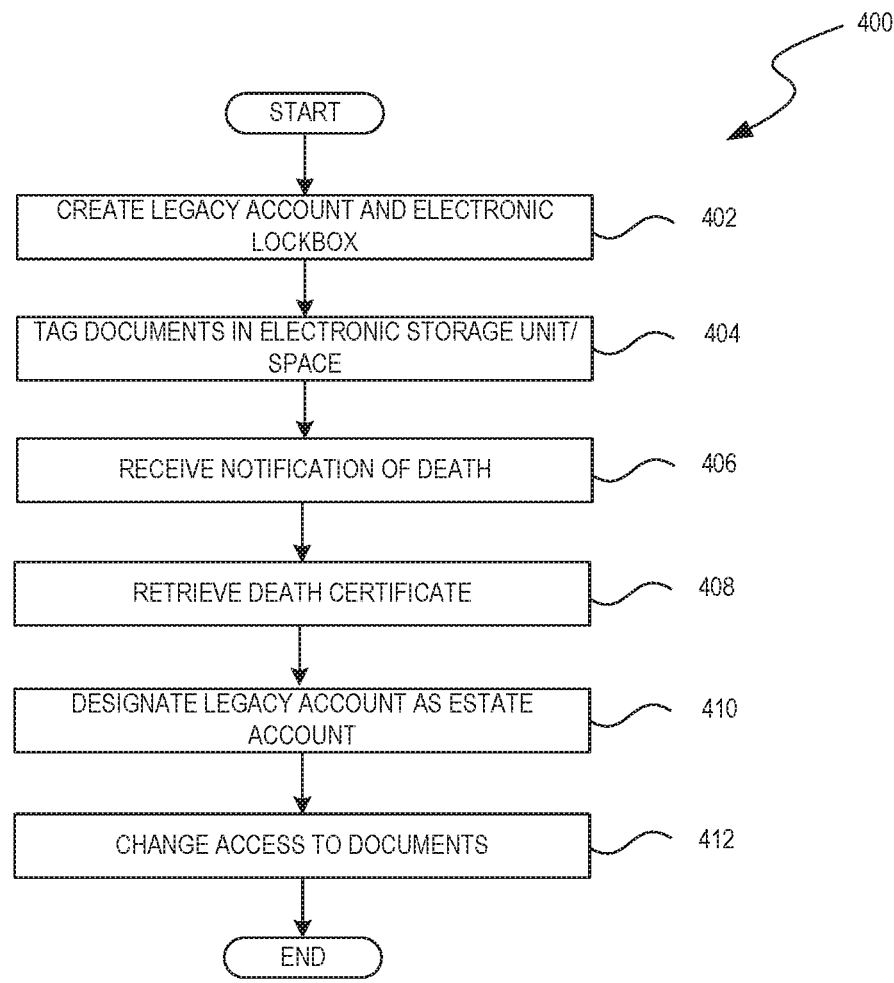
FIG. 4 is a flowchart illustrating a set of operations in accordance with various embodiments of the disclosure.

FIG. 4 is a flowchart illustrating a set of operations 400 for storing and accessing data. Creating operation 402 creates a legacy account for a user and an electronic storage unit/space associated with the legacy account. Tagging operation 404 tags documents in the electronic storage unit/space with access designations (e.g., identifying who can access the document, when the document can be accessed). Receiving operation 406 receives a notification that the user has passed away. The notification may be received via a document into the legacy account or a family member calling into the organization. Retrieving operation 408 may retrieve the death certificate from a state department database or other database on behalf of the members/survivors. In response to receiving the death certificate, designating operation 410 designates the legacy account as an estate account. Changing operation 412 changes access to the documents in the electronic storage unit/space. For example, appropriate parties may access documents that were not accessible while the user was alive (e.g., video e-cards).

Figure 5:
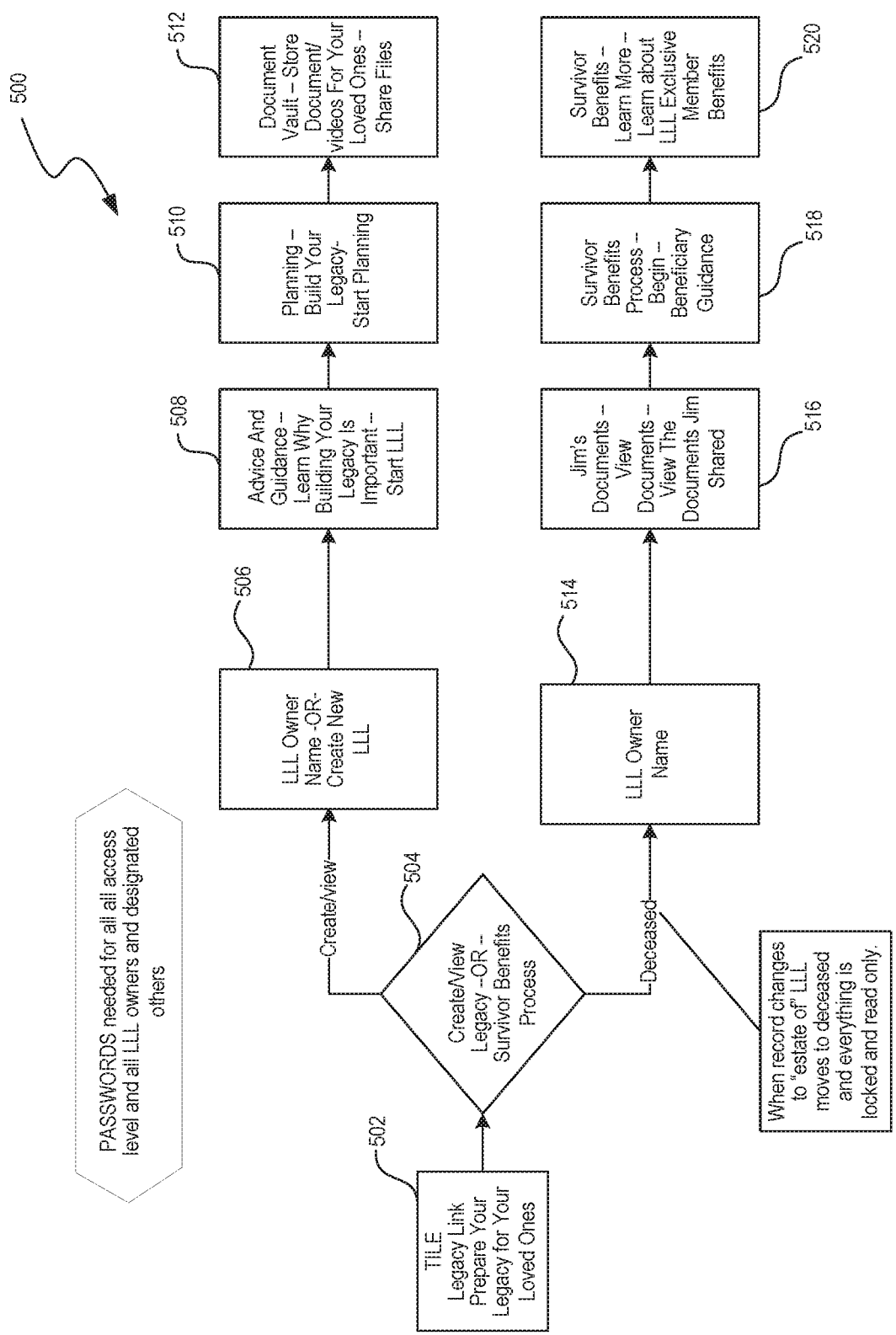
FIG. 5 is a flowchart illustrating a set of operations in accordance with various embodiments of the disclosure.

FIG. 5 is a flowchart illustrating a set of operations 500 for storing and accessing data. In operation 502, a Legacy Link message is displayed on a device inviting a user or a survivor to prepare a legacy (e.g., by creating a legacy account, naming beneficiaries, adding documents into an electronic storage unit/space). In decision operation 504, the user can either create/view an existing legacy or enter into the survivor benefits process. If the user would like to create/view a legacy, decision operation 504 branches to operation 506 where the user identifies and authenticates or creates a legacy account. Operation 508 displays a page showing advice and guidance for creating the legacy. Operation 510 begins the process of building a legacy by collecting information, among other things. Operation 512 stores documents in an electronic vault. The documents can include video e-cards, a will, love letters, passwords, and account information. The user may identify who can view these documents and when they can be viewed (e.g., pre-death or post-death).

If the user is a survivor and the legacy owner has deceased, the legacy account is changed to an estate account, documents are locked, and decision operation 504 branches to operation 514. In operation 514, the user can access survivor information and view documents shared by the deceased legacy account owner in operation 516. In operation 518, the survivor benefits process begins by providing the user with guidance. In operation 520, the survivor can learn more about exclusive benefits provided to members, if the user is not already a member.

Figure 6:
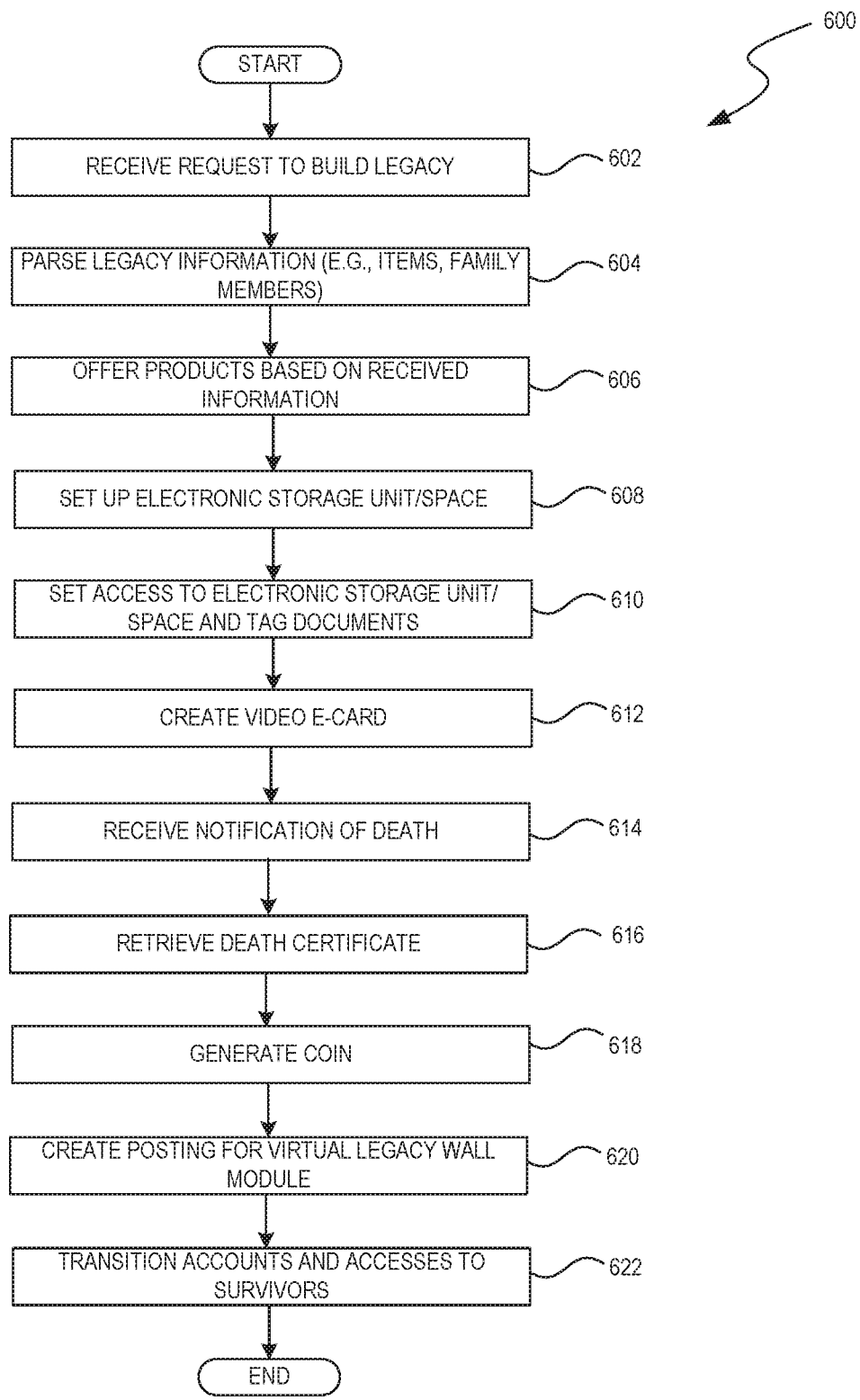
FIG. 6 is a flowchart illustrating a set of operations in accordance with various embodiments of the disclosure.

FIG. 6 is a flowchart illustrating a set of operations 600 for storing and accessing data. Receiving operation 602 receives a request to build a legacy. Building a legacy may include creating a legacy account, collecting information, offering products, among other things. Parsing operation 604 parses through the legacy information (e.g., items, accounts, family members) to determine whether the user would benefit from any products (e.g., insurance for a valuable item, estate planning documents if documents are missing). Offering operation 606 offers products based on the received information, if it would be beneficial to the user. Setting operation 608 sets up an electronic storage unit/space that the documents can be stored in. Tagging operation 610 tags documents that are stored in the electronic storage unit/space with access designations (e.g., who may view or edit the document, when the document may be viewed or edited). Default designations may be set based on the type of document but the user may change the access designations. Access to the electronic storage unit/space may be provided to the appropriate people (e.g., survivors, executors of the will, friends), with the appropriate restrictions in place.

Creating operation 612 creates a video e-card for the user. This allows the user to generate a video that is to be provided to the appropriate person upon the user's death or later. The video e-card may be stored in the electronic storage unit/space. Receiving operation 614 receives a notification of the death of the user. Retrieving operation 616 may retrieve the death certificate from a state department database or other database on behalf of the members/survivors. Generating operation 618 creates a commemorative coin for the survivors. Creating operation 620 creates a posting or a hologram for a virtual wall or remembrance of the user. Transitioning operation 622 transitions the accounts and accesses to the survivors and begins the survivor benefit process.

Figure 7:
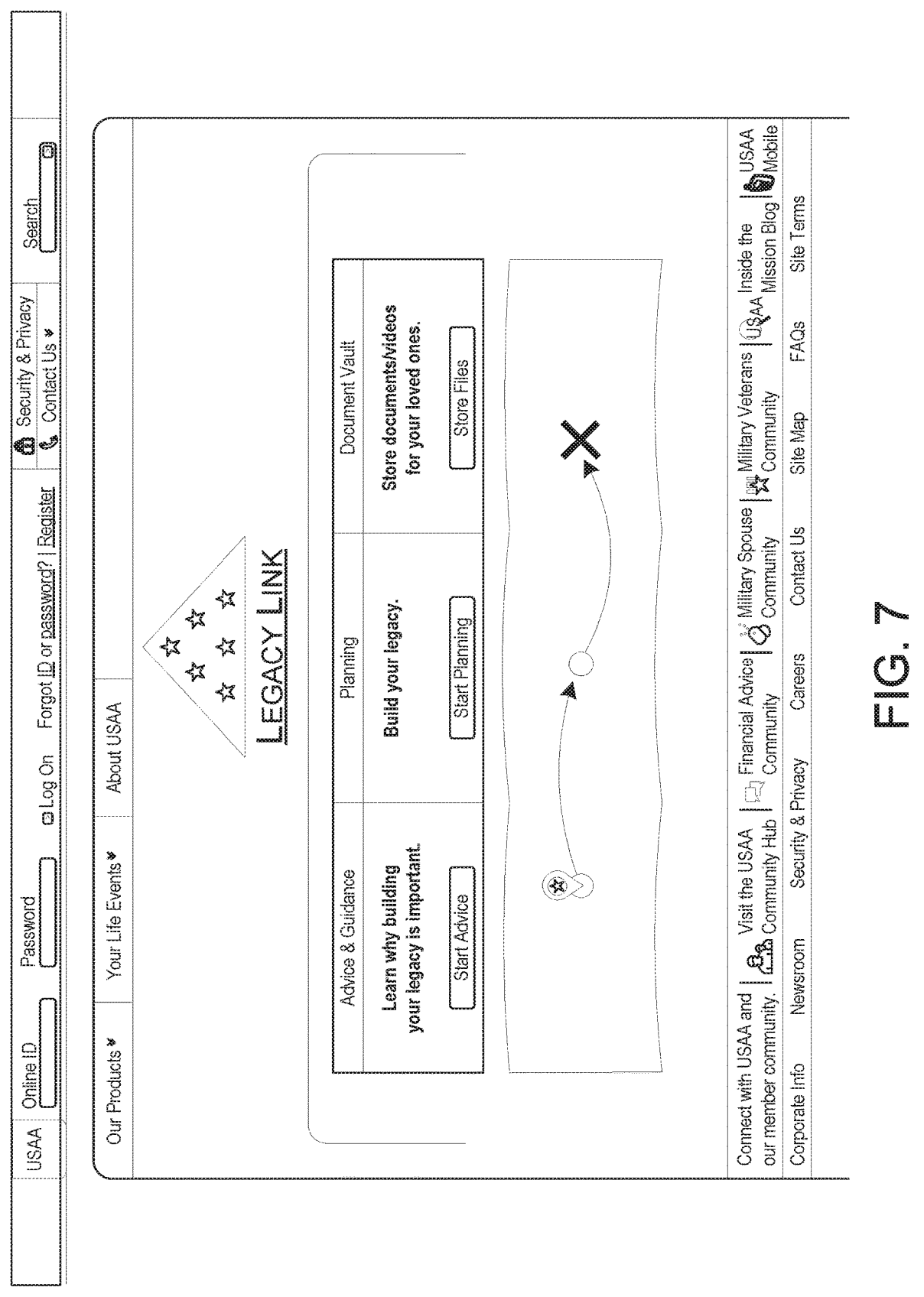

FIG. 7 illustrates a user interface that can be used to guide a user in setting up a legacy account. As shown, guidance and advice is provided, a legacy can be configured, and documents may be stored in an electronic storage unit/space.

Figure 8:
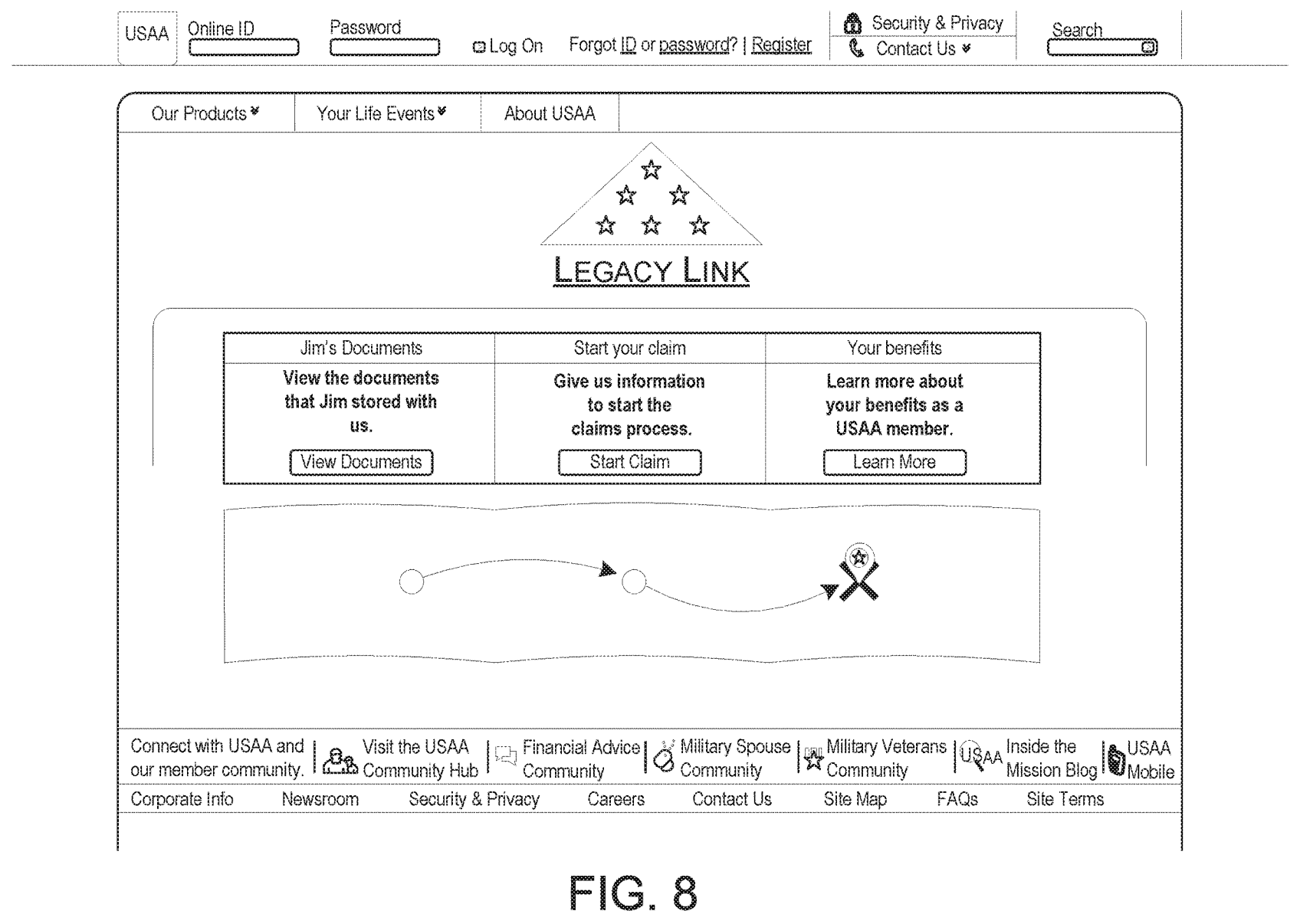

FIG. 8 illustrates a user interface that can be used to guide a survivor in receiving survivor benefits. As shown, the survivor can view the documents in the electronic storage unit/space, start the claims process, and learn about benefits of being a member.

Computer System Overview

Figure 9:
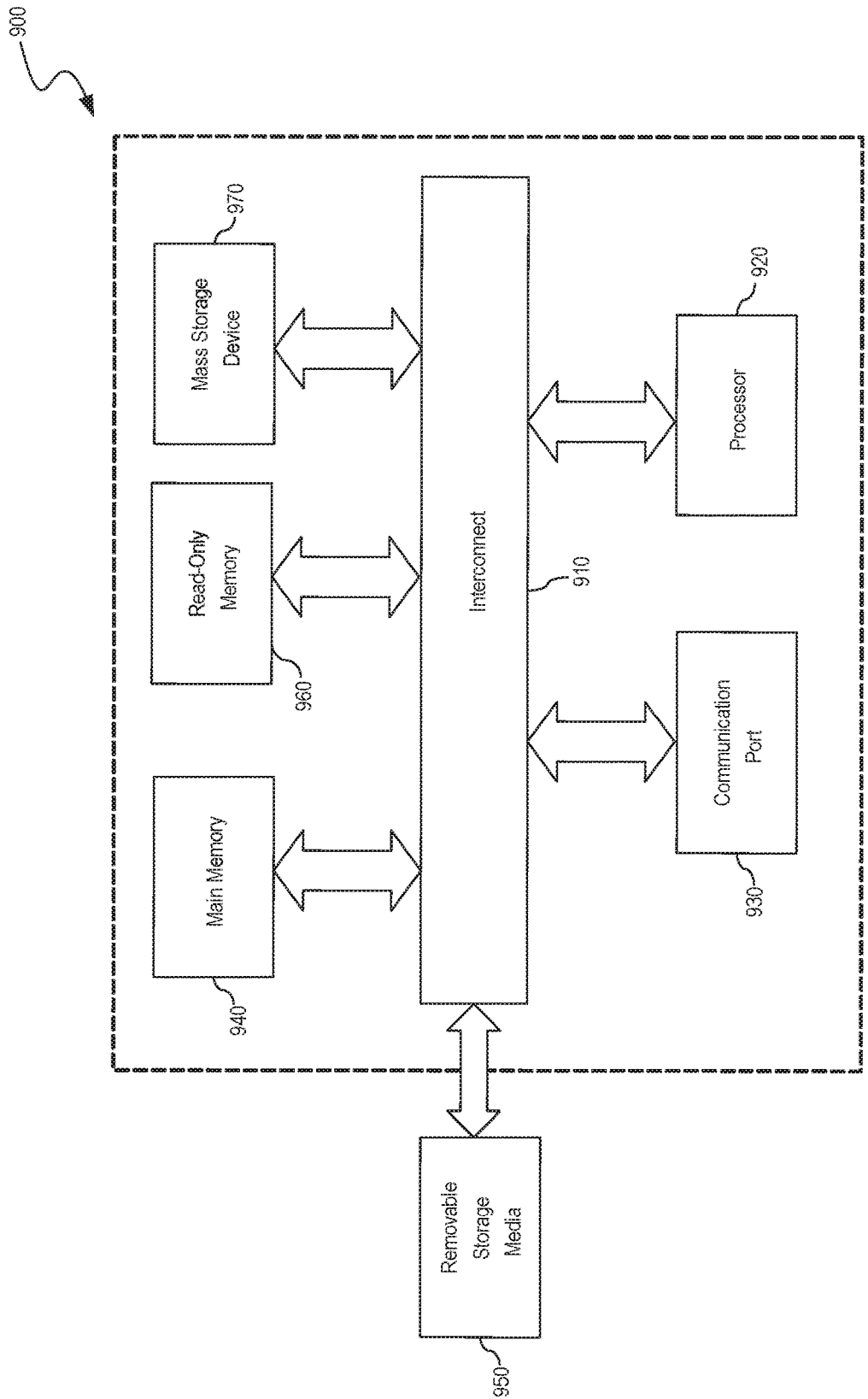
FIG. 9 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 9 is an example of a computer system 900 with which embodiments of the present disclosure may be utilized. According to the present example, the computer system includes an interconnect 910, at least one processor 920, at least one communication port 930, a main memory 940, a removable storage media 950, a read-only memory 960, and a mass storage 970.

Processor(s) 920 can be any known processor, such as, but not limited to, an Intel® Itanium® or Itanium 2® processor(s), or AMD® Opteron® or Athlon MP® processor(s), or Motorola® lines of processors. Communication port(s) 930 can be any of an RS-232 port for use with a modem-based dial-up connection, a 10/100 Ethernet port, or a Gigabit port using copper or fiber. Communication port(s) 930 may be chosen depending on a network such as a Local Area Network (LAN), Wide Area Network (WAN), or any network to which the computer system 900 connects.

Main memory 940 can be Random Access Memory (RAM) or any other dynamic storage device(s) commonly known in the art. Read-only memory 960 can be any static storage device(s) such as programmable read-only memory (PROM) chips for storing static information, such as instructions for processor 920.

Mass storage 970 can be used to store information and instructions. For example, hard disks such as the Adaptec® family of SCSI drives, an optical disc, an array of disks such as RAID, the Adaptec family of RAID drives, or any other mass storage devices may be used.

Interconnect 910 communicatively couples processor(s) 920 with the other memory, storage, and communication blocks. Interconnect 910 can be a PCI/PCI-X- or SCSI-based system bus, depending on the storage devices used.

Removable storage media 950 can be any kind of external hard-drives, floppy drives, IOMEGA® Zip Drives, compact disc read-only memory (CD-ROM), compact disc re-writable (CD-RW), or digital video disc read-only memory (DVD-ROM).

The components described above are meant to exemplify some types of possibilities. In no way should the aforementioned examples limit the disclosure, as they are only exemplary embodiments.

TERMINOLOGY

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for storing and accessing data in a legacy link. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A computerized method for creating and administering legacy accounts, the method comprising:
   in response to one or more requests from a user in relation to a legacy account, that is conditional on death of the user, to store electronic files including three or more of:

a will, investment documents, video files, password files, or medical directive files:
  creating, by a processor, the legacy account for the user and an electronic storage unit associated with the legacy account, wherein the legacy account is associated with an organization, and wherein the legacy account is associated with designated persons selected as beneficiaries by the user,
    wherein reward points are provided for purchases made relating to the files in the legacy account; and
    wherein storage is added to the electronic store unit in exchange for the reward points;
  receiving documents, for the designated persons, into the electronic storage unit of the legacy account;
  tagging each of the documents in the electronic storage unit with an access designation, wherein the access designation specifies access rights for the designated persons to the documents and specifies when the access rights apply to the documents;
  determining the designated persons associated with the legacy account are eligible for membership with the organization based at least in part on affinity groups of the designated persons, and if eligible, notifying the designated persons of their eligibility for membership; and
in response to receiving an indication of the death of the user of the legacy account:
  designating the legacy account as an estate account for the designated persons,
  changing, by the processor, the access to the each of the documents in accordance with the access designation and the designation of the legacy account as the estate account,
  locking, by the processor, the each of the documents such that the each of the documents are not editable by the designated persons,
  changing a call protocol for calls received from the designated persons after receiving the indication of the death of the user, wherein the call protocol is changed so that representatives answering calls received from the designated persons provide condolences and information relating to the user,
  directing the designated persons to specific portions of a website or mobile application for services relating to beneficiaries of the legacy account upon logon to the website or the mobile application, and
  transitioning funds from one or more accounts of the user to one or more accounts of the designated persons.

2. The computerized method of claim 1, wherein the documents are tagged based on a type of the documents.

3. The computerized method of claim 1, wherein the access designation designates whether the documents can be accessed before the death of the user or after the death of the user.

4. A non-transitory computer-readable storage medium, for creating and administering legacy accounts, comprising a set of instructions that, when executed by one or more processors, causes a machine to:
  in response to one or more requests from a user in relation to a legacy account, that is conditional on death of the user, to store electronic files including two or more of: a will, investment documents, video files, password files, or medical directive files:
    create the legacy account for the user and an electronic storage unit associated with the legacy account, wherein the legacy account is associated with an organization, wherein the legacy account is associated with designated persons selected as beneficiaries by the user;
      wherein reward points are provided for purchases made relating to the files in the legacy account; and
      wherein storage is added to the electronic store unit in exchange for the reward points;
    receive documents, for the designated persons, into the electronic storage unit of the legacy account;
    tag each of the documents in the electronic storage unit with an access designation, wherein the access designation specifies access rights for the designated persons to the documents and specifies when the access rights apply to the documents; and
    determine whether the designated persons associated with the legacy account are eligible for membership with the organization based at least in part on affinity groups of the designated persons, and if eligible, notifying the designated persons of their eligibility for membership;
  in response to receiving an indication of the death of the user of the legacy account:
    designate the legacy account as an estate account for the designated persons,
    change the access to the each of the documents in accordance with the access designation and the designation of the legacy account as the estate account,
    lock the each of the documents such that the each of the documents are not editable by the designated persons,
    change a call protocol for calls received from the designated persons after receiving the indication of the death of the user, wherein the call protocol is changed so that representatives answering calls received from the designated persons provide condolences and information relating to the user,
    direct the designated persons to specific portions of a website or mobile application for services relating to beneficiaries of the legacy account upon logon to the website or the mobile application, and
    transition funds from one or more accounts of the user to one or more accounts of the designated persons.

5. The non-transitory computer-readable storage medium of claim 4, wherein the documents are tagged based on a type of the documents.

6. The non-transitory computer-readable storage medium of claim 4, wherein the access designation designates whether the documents can be accessed before the death of the user or after the death of the user.

7. A data storage and access platform, for creating and administering legacy accounts, comprising:
  one or more processors; and
  a computer-readable storage medium having instructions stored thereon which, when executed by the one or more processors, cause the data storage and access platform to:
    in response to one or more requests from a user in relation to a legacy account, that is conditional on death of the user, to store electronic files including two or more of: a will, investment documents, video files, password files, or medical directive files:
      create the legacy account for the user and an electronic storage unit associated with the legacy account, wherein the legacy account is associated with an organization, wherein the legacy account is associated with designated persons selected as beneficiaries by the user;
wherein reward points are provided for purchases made relating to the files in the legacy account; and
wherein storage is added to the electronic store unit in exchange for the reward points;
receive documents, for the designated persons, into the electronic storage unit of the legacy account;
tag each of the documents in the electronic storage unit with an access designation, wherein the access designation specifies access rights for the designated persons to the documents and specifies when the access rights apply to the documents; and
determine whether the designated persons associated with the legacy account are eligible for membership with the organization based at least in part on affinity groups of the designated persons, and if eligible, notifying the designated persons of their eligibility for membership;
in response to receiving an indication of the death of the user of the legacy account:
designate the legacy account as an estate account for the designated persons,
change the access to the each of the documents in accordance with the access designation and the designation of the legacy account as the estate account,
lock the each of the documents such that the each of the documents are not editable by the designated persons,
change a call protocol for calls received from the designated persons after receiving the indication of the death of the user, wherein the call protocol is changed so that representatives answering calls received from the designated persons provide condolences and information relating to the user,
direct the designated persons to specific portions of a website or mobile application for services relating to beneficiaries of the legacy account upon logon to the website or the mobile application, and
transition funds from one or more accounts of the user to one or more accounts of the designated persons.

8. The data storage and access platform of claim 7, wherein the documents are tagged based on a type of the documents, and wherein the access designation designates whether the documents can be accessed before the death of the user or after the death of the user.

9. The data storage and access platform of claim 7, wherein the instructions, which when executed by the one or more processors, further cause the data storage and access platform to:

detect an incoming call from one of the designated persons, and
notify a representative answering the call of the designated person of the death of the user of the legacy account via a popup on a screen of the representative.

10. The computerized method of claim 1, further comprising: in response to receiving the indication of the death of the user of the legacy account, issuing a debit card to the designated persons identified as beneficiaries.

11. The computerized method of claim 1, further comprising, in response to receiving the indication of the death of the user of the legacy account, generating an entry on a virtual legacy wall, wherein the entry is a hologram of the user and a member number of the user with the organization.

12. The computerized method of claim 1, further comprising, in response to receiving the indication of the death of the user of the legacy account, sending a commemorative coin to a family member of the user, wherein the commemorative coin includes the member number of the user with the organization.

13. The non-transitory computer-readable storage medium of claim 4, wherein the set of instructions, when executed by one or more processors, further causes the machine to, in response to receiving the indication of the death of the user of the legacy account, generate an entry on a virtual legacy wall, wherein the entry is a hologram of the user and a member number of the user with the organization.

14. The non-transitory computer-readable storage medium of claim 4, wherein the set of instructions, when executed by one or more processors, further causes the machine to, in response to receiving the indication of the death of the user of the legacy account, send a commemorative coin to a family member of the user, wherein the commemorative coin includes the member number of the user with the organization.

15. The data storage and access platform of claim 7, wherein the instructions, when executed by the one or more processors, further cause the data storage and access platform to, in response to receiving the indication of the death of the user of the legacy account, generate an entry on a virtual legacy wall, wherein the entry is a hologram of the user and a member number of the user with the organization.

16. The data storage and access platform of claim 7, wherein the instructions, when executed by the one or more processors, further cause the data storage and access platform to, in response to receiving the indication of the death of the user of the legacy account, send a commemorative coin to a family member of the user, wherein the commemorative coin includes the member number of the user with the organization.

* * * * *